United States Patent [19]

Debortoli

[11] Patent Number: 5,138,688
[45] Date of Patent: Aug. 11, 1992

[54] OPTICAL CONNECTOR HOLDER ASSEMBLY

[75] Inventor: George Debortoli, Ottawa, Canada

[73] Assignee: Northern Telecom Limited, Montreal, Canada

[21] Appl. No.: 611,228

[22] Filed: Nov. 9, 1990

[51] Int. Cl.$^5$ .............................................. G02B 6/36
[52] U.S. Cl. ............................................................ 385/135
[58] Field of Search ................. 350/96.2, 96.21, 96.23, 350/96.1; 385/135

[56] References Cited

U.S. PATENT DOCUMENTS 4,995,688 2/1991 Anton et al. ...................... 350/96.1

FOREIGN PATENT DOCUMENTS 0211208 2/1987 European Pat. Off. ........... 350/96.2
0281196 9/1988 European Pat. Off. .......... 350/96.23
3532314 3/1987 Fed. Rep. of Germany ... 350/96.23

*Primary Examiner*—John D. Lee
*Assistant Examiner*—John Ngo
*Attorney, Agent, or Firm*—R. J. Austin

[57] ABSTRACT

A connector holder assembly for holding optical connectors in which a plurality of holders are disposed in a stack. Each holder has optical connectors in mounting positions at a front end region of the holder and rear ends of these connectors are connected to optical fibers disposed in coils in a storage facility. Provision is made for holding the holders in the stack, this provision comprising two rigid members one on each side of the stack, the rigid members being urged against the stack. The optical fibers in the storage facilities of all of the holders may be provided by a single or optical cable.

11 Claims, 5 Drawing Sheets

OPTICAL CONNECTOR HOLDER ASSEMBLY

This invention relates to optical connector holder assemblies for optical fibers.

Connector holders for optical fibers are known primarily through publications in patent specifications, but also in a few commercially available designs. In U.S. Pat. No. 4,792,203, for example, a holder structure is described in which a storage space is provided for optical fibers entering the structure from an incoming cable and optical connectors are mounted on an arm located at the one side of the holder. The optical fibers are connected each to one end of each connector. Other optical fibers exit from the other ends of the connectors and also pass through the storage space of the holder before proceeding as distribution fibers to telecommunications equipment in a customer's premises. A plurality of such holders are mounted in a housing and are pivotally attached so as to be movable into a withdrawn or use position within the housing or into an access position pivoted at the front of the housing for maintenance purposes.

In a further structure, such as described in German Offenlegungsschrift 2735106, a housing carries a tray which is pivotally mounted for movement in and out of the housing. Incoming optical fibers are stored within the tray and are connected to pigtail fibers also stored within the tray. The pigtail fibers extend from the tray to pigtail connectors mounted at the rear of the housing.

In a recent U.S. patent application Ser. No. 423,281 now U.S. Pat. No. 5,071,211 in the name of G. Debortoli and entitled "Connector Holders and Distribution Frame and Connector Holder Assemblies for Optical Cable", connector holders are described which are extremely convenient in use both for obtaining access to the optical fiber connectors and also for the fibers themselves. As described in the latter specification, when these holders are mounted in receiving stations in a distribution frame, an increased density of connectors is provided per frontal unit area of frame. In the connector holders as described in patent application Ser. No. 423,281, now U.S. Pat. No. 5,071,211 the connectors are mounted at a front end region of the holders so as to be located at the front of a distribution frame in use with one end of each connector faces forwardly for ease of connection of additional fibers. The connector holders described in the aforementioned pending application have connector guards which extend across the front end region of the connectors so that with the holders in use, the guards deflect any light beam exiting from a connector to which a fiber is not connected at the front of the connector.

While it is found that connector holders as described in the aforementioned patent application are commercially acceptable for the advantages of connector and fiber access and also for the relatively high density of connectors, it is believed that an inordinate amount of time is spent on-site by an assembler in assembling connectors and fibers into each holder, mounting each holder into a distribution frame, and then optically connecting incoming fibers to outgoing fibers through the connectors. This large amount of time is also influenced by the large number of holders incorporated into a distribution frame.

It would be particularly advantageous if an assembler could more quickly deal with the assembly of the holders into the frames together with their connectors and mounted fibers.

According to the present invention, there is provided an optical connector holder assembly for holding optical connectors for optical fibers comprising: a plurality of planar connector holders, each holder comprising a front end region, a rear end region, a storage facility for the storage of a plurality of coiled lengths of fiber with the coils in planes of the holder, and a mounting region disposed at the front end region of the holder and comprising a plurality of connector mounting positions disposed in a series which extends from mounting position to mounting position along the front end region of the holder; a plurality of optical connectors located in the mounting positions in each holder with an end of each connector facing forwardly from the front end region of the holder; a plurality of optical fibers each having a length extending outwardly from each holder and a length stored in coils in the storage facility and optically connected to a rearward facing end of an individual optical connector; and a means for positioning and retaining the holders in a stack with a fixed vertical relationship with the front end regions of the holders overlying one another, said positioning and retaining means detachably connected to the stack of holders.

The inventive assembly may be built in a factory environment and dispatched to the site of a distribution frame for assembly of the holders into the frame. Thus, an assembly is provided with connector holders which have previously been provided with fibers in their storage compartments and optical connectors connected by their rear ends to these fibers. It is a relatively simple matter for the assembler then to position the holders in receiving stations in the distribution frame. To provide an optical connection through the connectors, the assembler then connects the outwardly extending lengths of fibers in series with other fibers on one side of the holders, preferably by splicing, and the forwardly facing ends of the optical connectors are connected to further fibers. The fixed vertical relationship of the holders in the stack preferably substantially corresponds to their vertical position in the distribution frame.

In a preferred construction of the assembly, rear end regions of the holders project outwardly beyond the positioning and retaining means whereby the rear end regions may be located within the respective receiving stations of the holders, the positioning and retaining means may then be removed from the stack and the holders may then be inserted fully into the receiving stations. In order to prevent relative movement of the holders after insertion of their rear end regions into the respective receiving stations, it is preferable to dispose the positioning and retaining means at or adjacent front end regions only of the holders in the stack so that most of the length of each holder may be inserted into its receiving station before removal of the positioning and retaining means.

In the assembly, the positioning and retaining means preferably comprises two rigid members disposed one on each side of the stack of holders, the rigid members urged against the sides of the stack by an urging means extending across the stack from one rigid member to the other. For convenience and for speed of operation, the urging means comprises a flexible separable tie member extending around the rigid members to urge them towards the stack. Thus, the tie member is quickly severable to allow for removal of the rigid members. In other constructions, the urging means may be of more complex form, for instance, a screw-threaded or over-center lever device to hold ends of the rigid members against sides of the stack.

In order to position the holders in their desired positional relationships, the holders and the rigid members are preferably provided with ribs and rib receiving grooves which register with one another to locate the holders in vertical alignment. Other ribs and rib receiving grooves are provided to hold the holders in relative positions vertically. In a practical assembly, the ribs are provided upon the holders and the grooves are provided upon the rigid members.

According to the invention also, there is provided a method of assembling optical connector holders into a distribution frame comprising:- providing an optical fiber assembly for holding terminal connectors for optical fibers the assembly comprising:- a plurality of planar connector holders, each holder comprising a front end region a rear end region, a storage facility for the storage of a plurality of coiled lengths of fiber with the coils in planes of the holder; and a mounting region disposed at the front end region of the holder and comprising a plurality of connector mounting positions disposed in a series which extends from mounting position to mounting position along the front end region of the holder; a plurality of optical connectors located in the mounting positions in each holder with an end of each connector facing forwardly from the front end region of the holder; a plurality of optical fibers each having a length extending outwardly from each holder and a length stored in coils in the storage facility and optically connected to a rearward facing end of an individual optical connector; and a means for positioning and retaining the holders in a stack with a fixed vertical relationship and with the front end regions of the holders overlying one another, said positioning and retaining means detachably connected to the stack of holders with rear end regions of the holders in the stack projecting beyond the positioning and retaining means; supporting rear end regions of the holders within a distribution frame at receiving stations for the holders; and removing the positioning and retaining means and then inserting the holders fully into their receiving stations.

Preferably, the distribution frame and the holders coact to receive the holders by sliding reception into the receiving stations. In this case particularly, it is advantageous to dispose the positioning and retaining means at or adjacent the front end regions of the holders in the stack to enable the holders to be received for substantial parts of their lengths in the receiving stations before removal of the positioning and retaining means.

One embodiment of the invention will now be described, by way of,. example, with reference to the accompanying drawings, in which.

Figure 1:
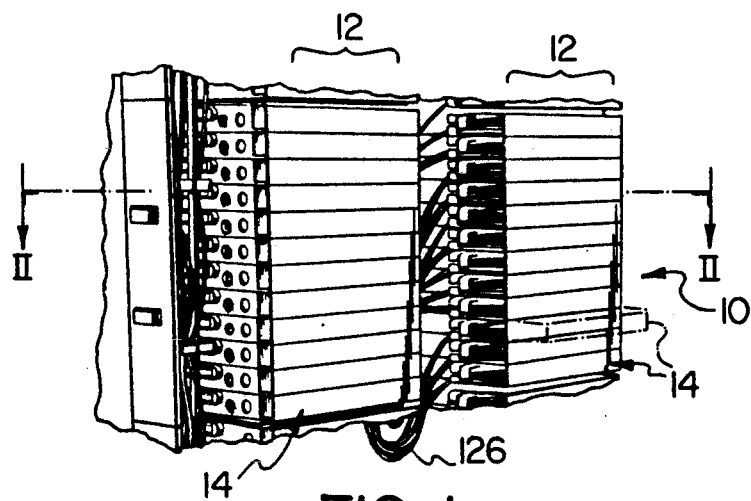
FIG. 1 is an isometric view from one side of a part of a distribution frame and optical connector holder assembly.
Figure 2:
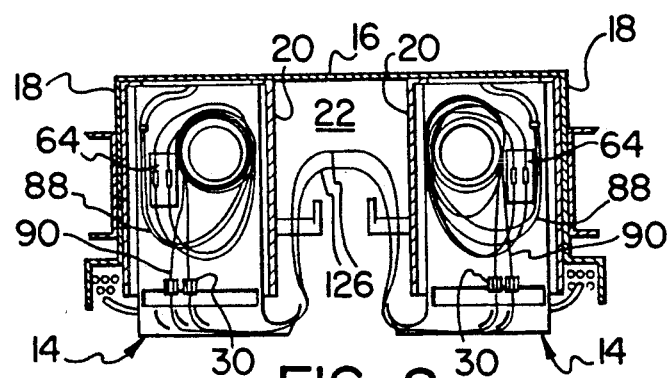
FIG. 2 is a cross-sectional view through the assembly of FIG. 1 taken along line II—II in FIG. 1.

In the embodiment, as shown in FIG. 1, an optical fiber distribution frame 10 holds two vertical banks 12 of planar connector holders 14 for connecting a plurality of incoming optical fibers to outgoing optical fibers. As shown in FIGS. 1 and 2, the distribution frame comprises a rear wall 16 and remote side walls 18 which extend from the rear to an open front of the frame. Between the side walls 18 are two other walls 20 which extend forwardly from the rear wall 16 and lie in parallel relationship to the side walls 18. In each bank 12, a side wall 18 and its corresponding wall 20 define between them receiving stations for the connector holders 14. The two walls 20 are spaced apart as shown in FIG. 2 to provide a storage channel 22 for optical fibers leading from front end regions of the connectors as will be described. The distance between the walls 20 is sufficient to ensure that where loops of fiber are to be disposed within the storage channel then these loops will not have a bend radius below a desired minimum. Each of the connector holders 14 is insertable into a respective receiving station from the front of the distribution frame and is locatable in two positions in the respective station, i.e. in a rearward operative position as shown in FIG. 2 and in full outline in FIG. 1, and a forward connector access position as shown in chain-dotted outline in FIG. 1. The arrangement of the holders 14 in the distribution frame and the construction of the distribution frame is basically similar to that described in copending U.S. patent application Ser. No. 423,281 filed Oct. 18, 1989 now U.S. Pat. No. 5,071,211 (Canadian Application Serial No. 615,192 filed Sep. 29, 1989), entitled "Connector Holders and Distribution Frame and Connector Holder Assemblies for Optical Cable" in the name of G. Debortoli, et al.

Each of the connector holders 14 is basically of the structure described in the above-mentioned copending application. Holders in the right-hand bank 12 in FIG. 1 are of opposite hand to those in the left-hand bank 12. In the following description, a holder for accommodation in the right-hand bank will be described with the understanding that the holders in the left-hand bank are of opposite hand.

Figure 3:
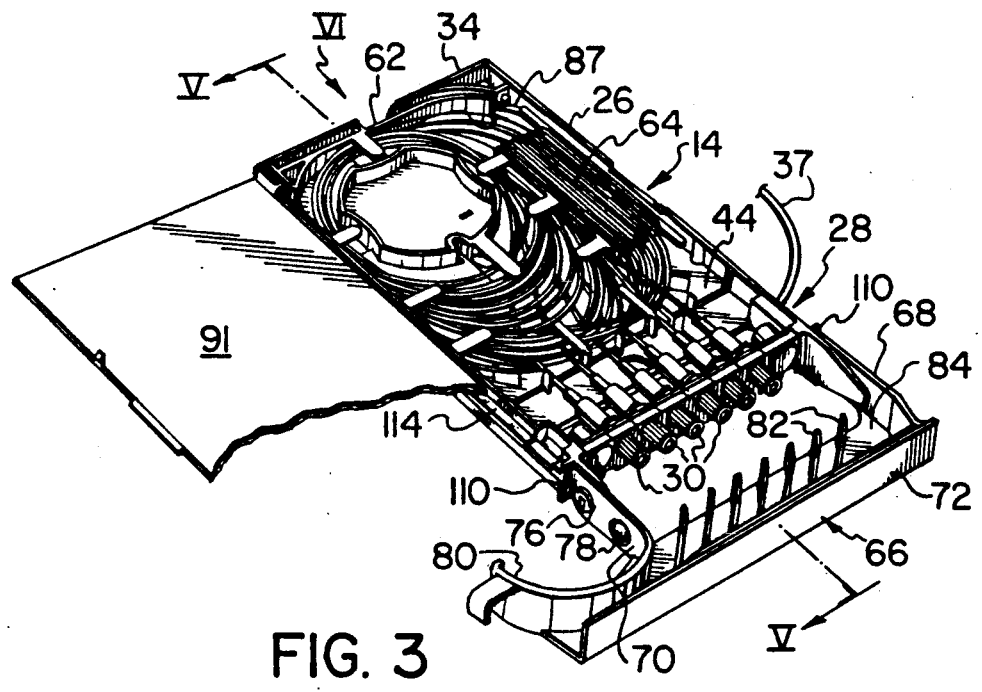
FIG. 3 is an isometric view from one side of a connector holder/which is incorporated into the frame of FIG. 1.
Figure 4:
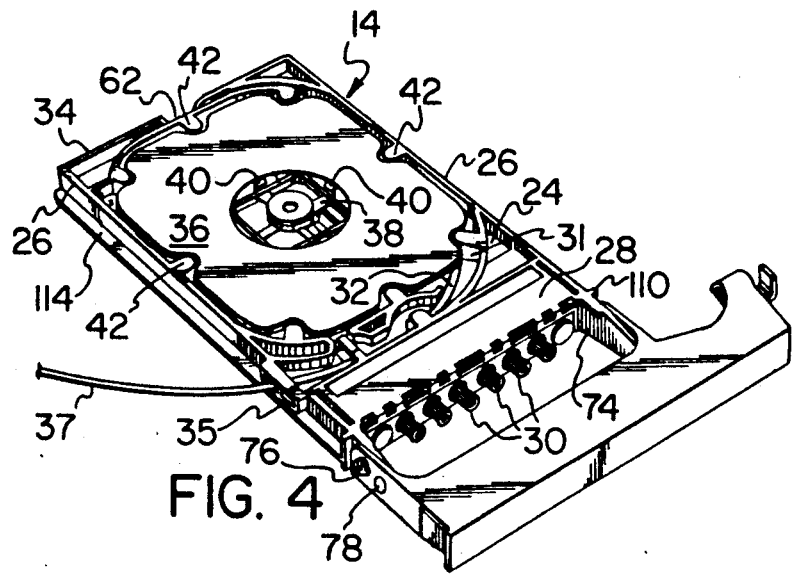
FIG. 4 is an isometric view of the underside of the connector holder.

Each holder 14 of the right-hand bank is of planar configuration as shown in FIG. 3 and has a planar base 24 (FIGS. 3, 4 and 5) in the plane of the holder, the base 24 being bordered by side walls 26 which extend to both sides of the base in the depth direction of the holder. At a front end region of the holder is provided a mounting region 28 for optical connectors 30 to be positioned laterally spaced from one another across the width of the holder frame from one side wall 26 to the other. On one side of the base and between the side walls 26 there is provided a storage compartment 31 (FIGS. 4 and 5) for incoming optical fibers stored within a tube 32 which is one of a plurality of tubes 32, the tube extending through an inlet 35 to provide an outwardly extending length 37. The inlet 35 is laterally at an edge of a side 26, i.e. at the top side of the inlet in FIG. 4, so as to permit the tube 32 to be inserted into the inlet. The storage compartment 31 extends between the mounting region 28 and a rear end wall 34 at a rear end region of the holder, the rear end wall extending between the side walls 26. The compartment 31 is provided with a cover 36 which covers substantially the whole of the compartment 31 except the surrounding edges. The cover 36 is movable at right angles to its plane between an inner operative position as shown in FIG. 4 and a slightly retracted position (not shown) in which it stands upwardly from the walls 26 to enable the tube 32 to be passed laterally between edges of the cover and ends of the walls 26 during assembly of the tube into the compartment. The cover is mounted upon a central structure shown at 38 in FIG. 4 and is locatable in its operative and retracted positions by latches 40. Localized flanges 42 extend inwardly into recesses in the cover 36 so as to distort the gap around the cover to render it impossible for a tube to be removed with the cover in its operative position.

On the other side of the holder as shown in FIG. 3 a second compartment 44 is provided. This compartment also extends from the mounting region to the rear end 34 of the holder.

Figure 5:
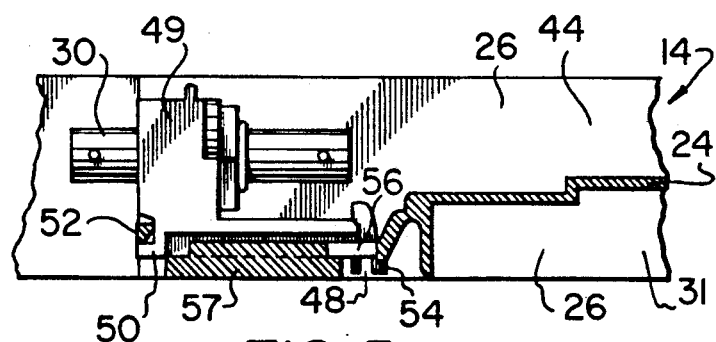
FIG. 5 is a cross-sectional view taken through the connector holder along line V—V in FIG. 3 and showing a part of the holder on a larger scale.

The base 24, as shown in FIG. 5, extends downwardly at an inclined front end 46 so as to define one side of a recess 48 which extends from side-to-side of the holder at the mounting region 28, the recess being provided to accommodate the connectors 30 in their side-by-side positions. As described in the aforementioned application, each connector 30 is held by a connector mount 49 which is provided with a forwardly facing foot 50 (FIG. 5) which is to be disposed under an overhanging element 52 at a front side of the recess. The other end of each connector mount has a flexible latch 54 which is received through a hole 56 in the base of the recess, the latch then engaging beneath the inclined side 46 to hold the connector mounts in position. Within the recess are provided a plurality of ribs 57 which are laterally spaced apart across the width of the holder and extend in a direction from the front end region towards the rear end region.

Figure 6:
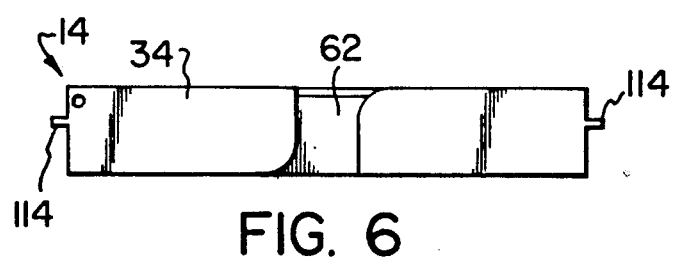
FIG. 6 is a rear end view of the holder taken in the direction of arrow VI—VI in FIG. 3.

The two compartments are connected at the rear wall 34 of the connector by interconnecting passage 62 (see FIG. 6) to enable the tube 32 to pass from one compartment to the other.

In the other compartment 44, a splice block 64 (FIG. 3) is provided for connecting incoming optical fibers to pigtail fibers, the other ends of the pigtail fibers being provided by the connectors 30.

Each holder 14 also comprises a connector guard 66 mounted at its front end. Generally the guard is as described in the copending application referred to above in that the guard 66 has two sides 68 and 70 and a front 72 which extends across the width of the holder. The two sides 68 and 70 are hinged so as to be movable between an upper connector guarding position in the plane of the holder as shown in FIG. 3 and a downward position (not shown) removed from the guarding position.

The guard 66 and the mounting for the guard differ however from the previous application in the following ways.

The guard is pivoted in front of the mounting region 28 upon two forward extensions 74 of the side walls 26 at positions 76 and is normally retained in the guarding position by domed protrusions 78 on free ends of the arms 74, the domed protrusions extending into holes in the side walls 68 and 70. To move the guard 66 into and out of the guarding position, downward or upward pressure on the front of the guard is sufficient so as to cause the walls 74 to flex inwardly and cause the protrusions 78 to move into or out of the respective holes in the side walls 68 and 70. A space defined between the mounting region 28 and the front 72 of the guard has an inlet provided between the front 72 and an arcuate extension 80 of the side wall 70. The arcuate extension 80 extends laterally sideways from the side 70 and the holder and provides a means for limiting the minimum bend radius of fibers extending from the space while allowing them to pass rearwardly of the holder. The arcuate extension 80 is spaced slightly rearwardly of the front 72 of the guard to provide the inlet.

Means for limiting the minimum bend radius of optical fibers in the space is provided for ends of fibers as they extend from forward facing ends of the connectors 30 when they change direction to pass through the inlet. The means for limiting the minimum bend radius at this position comprises a plurality of arcuate vanes 82 (FIG. 3) which are disposed in spaced positions across the width of the holder and are supported each by one end upon a flange 84 extending rearwardly from the front 72. The vanes 82 extend upwardly from flange 84 and are suitably positioned relative to respective mounting positions for the connectors 30 so that ends of optical fibers in the space and extending to the connectors 30 engage against a convex surface of a respective vane as it changes direction towards the inlet. With the convex surface of each vane formed to provide a desirable minimum bend radius for the fibers, then no undue mechanical stresses or attenuation will take plane in fibers engaging these surfaces.

Figure 7:
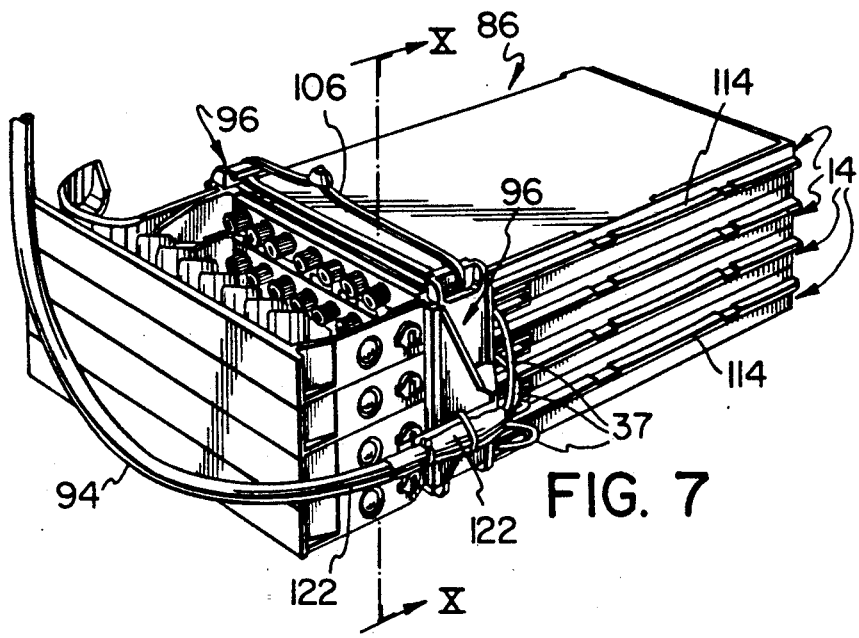
FIG. 7 is an isometric view of a connector holder assembly incorporating connector holders as shown in FIGS. 2 to 6.
Figure 10:
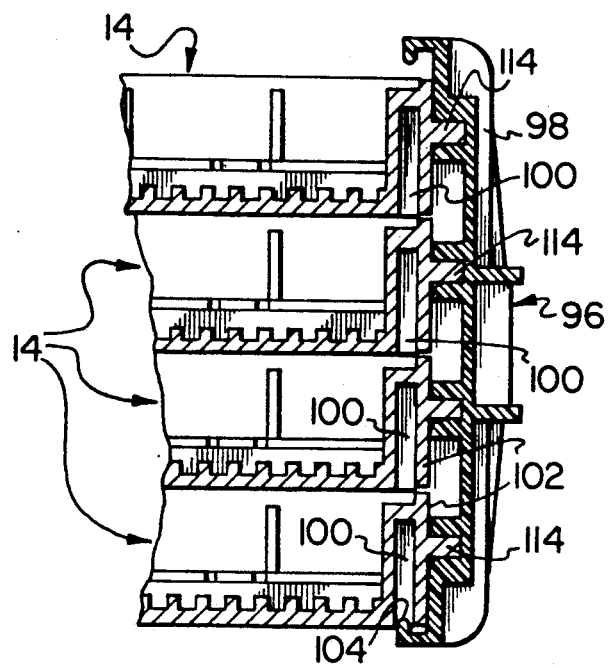
FIG. 10 is a cross-sectional view taken through the assembly along line X—X in FIG. 7 and showing a detail of the assembly.

In the following description which is concerned, in this embodiment, with an exemplification of the invention, a connector holder assembly 86 for simplifying the assembly of connector holders into the distribution frame will now be described. This assembly provides connector holders 14 for the right-hand bank 12 of holders. As shown in FIGS. 7 and 10, the assembly 86 comprises a plurality, namely four, holders 14 disposed in a vertical stack. It should be understood that while four holders are described in the assembly 86, any number of stacked holders may be incorporated dependent upon their handleability.

Each of the holders 86 has been previously fitted, before incorporation into the stack, with a plurality of connectors 30 (FIGS. 3 and 5) in their side-by-side positions in the mounting region 28. Also, each holder has been previously provided with its own optical fiber storage tube 32 with its outwardly extending length 37, the tube extending through the inlet 35 (FIG. 4) and extending in coiled form around the compartment 31. The tube passes from the storage compartment 31 through the interconnecting passage 62 (FIG. 6) and into the storage compartment 44, the tube having an end which is held to the holder at position 87 by a strain relief. A plurality of fibers 88 (FIG. 2), one for each connector, extend from the tube end and coil around the compartment 44 before being spliced at the splice block 64 to pigtail fibers 90 which form pigtails with the connectors 30 to which they are optically connected.

With all the four holders 14 equipped with fibers and connectors in the above way and with hinged covers 91 of the holders (FIG. 3) positioned to cover the compartments 44, the four holders are stacked. This necessarily involves having the guards 66 in their guarding positions shown in the figures. Conveniently, each of the tubes 32 forms part of an optical cable 94 (FIG. 7) with all of the cable terminating except for the tubes 32 so that the projecting outwardly extending lengths 37 and the parts of tubes 32 within the holders are provided for connection to the connectors 30.

Figure 8:
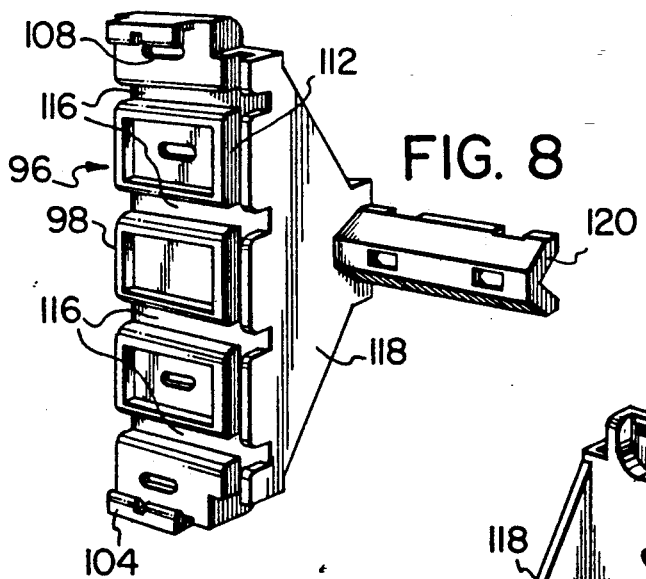
FIGS. 8 and 9 are isometric views from opposite sides of a rigid member forming part of the assembly of FIG. 7.
Figure 9:
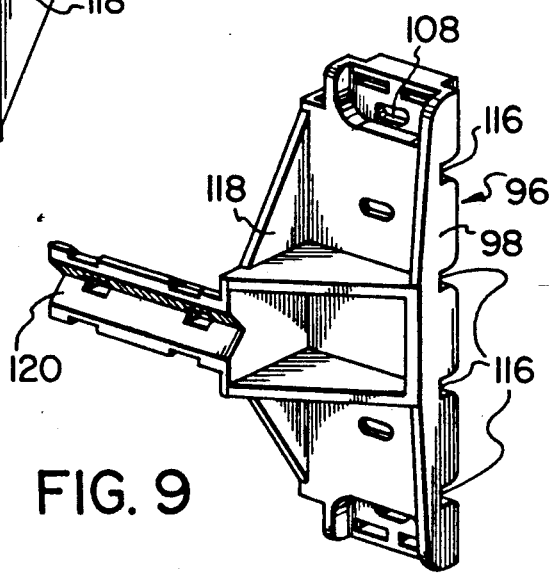

The holders 14 of the assembly 86 are held in their stacked positions by a positioning and retaining means detachably connected to the stack. This position and retaining means comprises two rigid members 96 disposed one on each side of the stack. Each member as shown in FIGS. 8, 9 and 10 comprises an elongate stack engaging portion 98 which is disposed vertically of the stack with the members 96 disposed directly outwardly of the mounting region 28. Each holder 14 in the stack has, on its underside, two recesses 100, one recess for each holder only being shown in FIG. 10. The recesses for each holder are disposed one at each end of the mounting region 28 and are spaced from the side surface 102 of the holder. The lowermost holder 14 of the stack has its recesses 100 facing outwardly, i.e. downwardly from the stack. Each rigid member 96 has a lower end which turns around and upwardly as a lipped flange 104 (FIGS. 8 and 10). With each rigid member in a stack supporting position (FIG. 7) i.e. one on each side of the stack, the lower end of the rigid member, i.e. the lipped flange 104, extends around a respective side of the stack and the lipped flange engages and registers within the respective recess as shown by FIG. 10.

The rigid members are assembled onto the stack with each member initially inclined slightly outwards from the stack and with the lipped flange engaging within the respective recess 100. The rigid members are then pivoted upwardly into engagement with the sides of the stack (FIGS. 7 and 10) and are held in this position by an urging means which pulls the upper ends of the rigid members towards each other and against the sides of the stack. This urging means comprises a flexible severable tie member 106 (FIG. 7) of known plastics structure which passes over the stack and through apertures 108 (FIGS. 8 and 9), at top ends of the stack engaging portions 98, to provide a continuous band.

The rigid members 96 locate the holders 14 in vertical alignment in the stack and at specific relative positions vertically. Vertical alignment and positioning is provided by interengaging ribs and rib engaging grooves which may be provided alternatively upon the holders or upon the rigid members 96. In this embodiment, however, on the holders short vertical ribs 110 (FIGS. 3 and 4) extend outwards from the sides of each holder. The ribs 110 at each side are received within a vertical groove 110 (FIG. 8) which extends vertically from end-to-end of a respective stack engaging portion 98 and the holders are thus vertically aligned.

Vertical positioning is provided by other ribs and grooves. As shown by FIGS. 3, 4, 7, 10 and 11, each holder 14 has on each side wall 26 an outward horizontal flange 114 which extends from and joins the respective rib 110 to the rear end of the holder. The ribs 114 of each holder are slidable upon horizontal support surfaces of supporting track guides (not shown) which are carried in fixed positions upon the walls 18 and 20 of the distribution frame and extend from front to rear of the frame. Thus, each holder is movable into and out of its respective receiving station by horizontal sliding movement through the front of the frame. The horizontal support surfaces are vertically spaced just sufficiently to provide slight vertical clearance between the holders 14 to allow for their horizontal movement within the frame without interfering with one another. The ribs 114 are received in the assembly 86 within short horizontal grooves 116 of the respective stack engaging portions 98 (FIGS. 8 and 9), the grooves 116 interconnecting with the vertical groove 112. The grooves 116 are spaced apart so that the holders 114 at their front end regions are vertically located in the slightly spaced positions they will assume when in the frame. The rigid member 96 which is disposed at the side of the stack of holders from which the tube length 37 extends, is provided with a tapered flange 118 extending normal to the plane of the stack engaging portion 98 and in a direction away from the grooves 112, 116. This flange carries at its outer end, an integral channel 120 of V-shaped section which extends away from the stack engaging portion 98 and in planes substantially parallel to those of the stack engaging portion. The end of the jacket of the cable 94 is held securely within the channel 120 (FIG. 7) by ties 122 which pass around the jacket and through apertures in the channel for location purposes.

A plurality of the assemblies 86 are pre-built under factory conditions for installation within a distribution frame. The holders 14 within each of the assemblies 88 are assembled together each with its pigtail fibers 90 extending from the connector 30 to the splice block 68 of the holder. The cable 94 for each assembly has its optical fiber tubes 32 extending from its end, these tubes extending into each of the four respective holders 14 and passing around the storage compartments 31 and 44 in the manner described above. The four holders 14 for the assembly are then stacked together under factory conditions and the rigid members 96 are then disposed in their positions at the sides of the stack, as described above with regard to FIGS. 7 and 10, prior to the flexible severable member 106 being placed in position to hold the assembly together. The cable sheath is then secured to the V-shaped channel 120 by the ties 122 as described.

Figure 11:
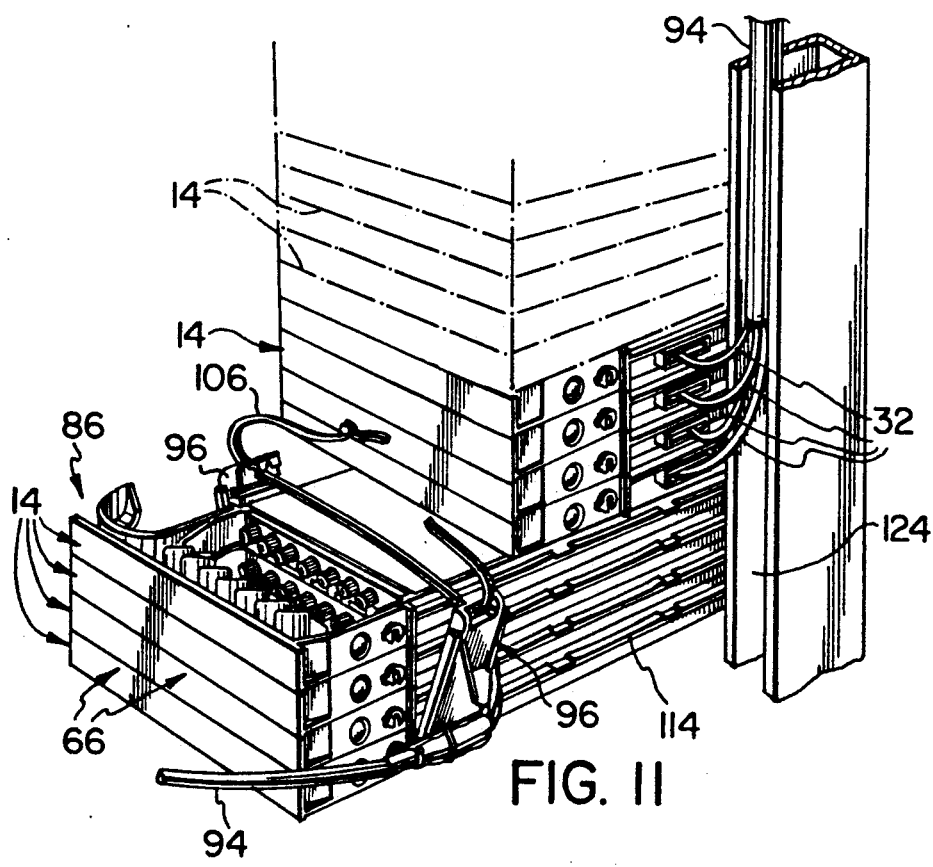
FIG. 11 is an isometric view of the assembly of FIG. 7 and showing the connector holders of the assembly being assembled into the distribution frame shown in FIG. 1.

A plurality of the assemblies 86 are then offered to the right-hand bank 12 of receiving stations in the distribution frame. In each assembly, the rear ends of the holders extend rearwardly beyond the rigid members 96 and are thus locatable substantially in their respective receiving stations in the distribution frame before the retaining and positioning means need be removed. As shown in FIG. 11, previous holders 14 are already disposed in their receiving stations within the right-hand bank of the distribution frame and the outwardly extending ends 37 of the tubes extend into their cables 94 which are stored in a vertical storage channel 124 of the distribution frame. All of these holders have been inserted from assemblies such as 86 discussed above. The next assembly 86 is then inserted into the frame as shown by FIG. 11 and as the holders 14 are moved rearwardly into their respective receiving stations and just before the positioning and holding means contacts the fronts of the previous holders, the flexible tie member 106 is severed. This causes the rigid members 96 to pivot outwardly under their own weight away from the stack of members 14 as shown by FIG. 11 so that the rigid members may be removed. This operation is preceded by severing the ties 122 which hold the cable to the grooved member 120. The holders 14 of this subassembly are then moved backwards into their receiving stations so as to lie with the fronts 72 of their guards 66 vertically aligned with the previous holders. The corresponding cable 94 is then positioned by the side of the previous cable inside the storage channel 124.

Thus, the right-hand bank of the receiving stations in the distribution frame are equipped with holders in the manner described above. The left-hand bank 12 of receiving stations (FIG. 1) is dealt with in similar manner with holders of opposite hand from those discussed in the embodiment.

As may be seen from the above description, it is a relatively quick and simple matter for an assembler to assemble holders complete with connectors and fibers into a distribution frame without time and effort wasted on-site to assembly each individual holder with its connectors and fibers. It is advantageous therefore to form the assemblies 86 under factory conditions and be able to store them for subsequent use on-site in distribution frames.

Subsequently to the assembly of the holders 14 into the frame, patch cords 126 are connected from selected connectors 30 in any holder 14 in the right-hand bank 12 to any selected connector 30 in any holder 14 in the left-hand bank 12. These patch cords as shown in FIG. 2 hang down in loops between the banks of holders within the vertical storage channel 22 provided as shown in FIGS. 1 and 2.

Figure 12:
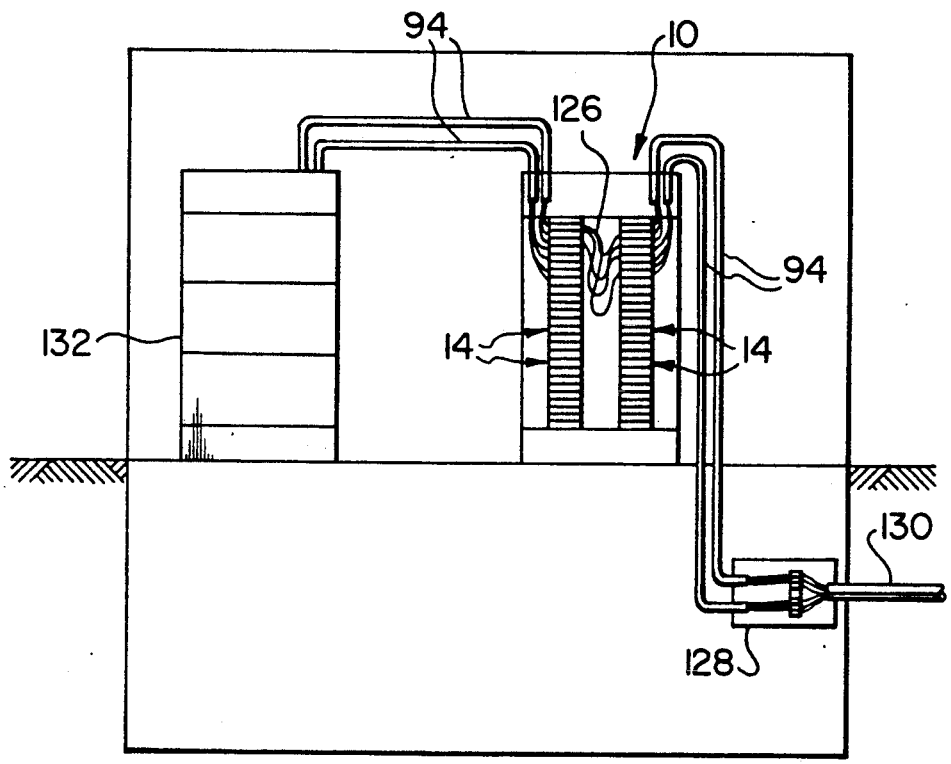
FIG. 12 is a diagrammatic view of the distribution frame together with its connector holders showing optical connections from the frame and within a building.

The cables 94 are of sufficient length to extend to a splice closure 128 for splicing to an incoming cable 130 entering into the building. Optical fibers within tubes of the incoming cable 130 diverge within the splice closure to be spliced to individual fibers of the tubes 94. FIG. 12 shows two tubes, by way of example, extending from the distribution frame 10 to the splice closure 128. The patch cords 126 then extend between the two banks of holders and the cables 94 from the left-hand bank as shown in FIG. 12 extend into an equipment bay 132 in which the optical fibers of that cable are connected to further optical fibers which extend interiorly throughout the building to individual items of telecommunications equipment. The total on-site assembly time for the holders into the distribution frame and connection through from an incoming cable to various telecommunications equipment is significantly shortened using the assemblies 86 of optical connectors according to the embodiment.

What is claimed is:

1. A connector holder assembly for holding terminal connectors for optical fibers comprising:
   a plurality of planar connector holders disposed to provide a stack of holders, each holder comprising a front end region, a rear end region, a storage facility for the storage of a plurality of coiled lengths of fiber with the coils in the planes of the holder, and a mounting region for mounting a plurality of optical connectors in the holder, the mounting region disposed at the front end region of the holder and comprising a plurality of individual connector mounting positions disposed from mounting position to mounting position across the front end region of the holder;
   a plurality of optical connectors located in the mounting positions in each holder with an end of each connector facing forwardly from the front end region of the holder;
   a plurality of optical fibers each having a length extending outwardly from each holder and a length stored in coils in the storage facility and optically connected to a rearward facing end of an individual terminal connector;
   and a means for positioning and retaining the holders in the stack with a fixed vertical relationship and with the front end regions of the holders overlying one another, said positioning and retaining means detachably connected to the stack of holders.

2. A connector holder according to claim 1 wherein the positioning and retaining means comprises two rigid members disposed one on each side of the stack of holders, the rigid members urged against the sides of the stack by an urging means extending across the stack form one rigid member to the other.

3. A connector holder assembly according to claim 2 wherein each of the rigid members has one end received in a registration position with a holder at one end of the stack and the other ends of the rigid members are urged towards each other by the urging means so that the urging means and the registered ends of the members serve to hold the members against the sides of the stack.

4. A connector holder assembly according to either of claims 2 and 3 wherein the urging means comprises a flexible severable tie member extending around the rigid members to urge them towards the stack.

5. A connector holder assembly according to claim 3 wherein said holder at the end of the stack has a recess facing outwardly from the end of the stack and spaced from each side surface of the stack, and the one end of each rigid member extends around a respective side of the stack and is received in registration with the recess and with the rigid member engaging the side of the stack.

6. A connector holder assembly according to claim 5 wherein during removal of the positioning and retaining means, each rigid member is removable from the stack by pivotal movement of the member away from the associated side of the stack and about said end in registration with the recess.

7. A connector holder assembly according to claim 2 wherein the rigid members locate the holders in vertical alignment and at specific relative vertical positions.

8. A connector holder assembly according to claim 7 wherein the vertical alignment and specific relative vertical positioning of the holders is provided by interengagement of ribs and rib engaging grooves provided upon the holders and the rigid members.

9. A connector holder assembly according to claim 8 wherein the holders have first ribs which extend vertically in the stack and the rigid members are formed with vertical grooves which register with the first ribs to locate the holders in vertical alignment, the holders also having second ribs which extend horizontally in the stack and are registered within spaced horizontal grooves in the rigid members to provide the relative vertical positions of the holders.

10. A connector holder assembly according to claim 2 wherein, for each holder, the lengths of a plurality of optical fibers extending outwardly from the holder are housed together within a tube and the tubes are held against one of the rigid members.

11. A connector holder assembly according to claim 10 wherein the tubes form part of an optical cable and the optical cable is held against the one rigid member.

* * * * *